United States Patent [19]

Redmore et al.

[11] 4,057,554

[45] Nov. 8, 1977

[54] QUATERNARY AMMONIUM SALTS OF POLYEPIHALOHYDRIN

[75] Inventors: Derek Redmore, Ballwin; Frederick T. Welge, Affton, both of Mo.

[73] Assignee: Petrolite Corporation, St. Louis, Mo.

[21] Appl. No.: 556,570

[22] Filed: Mar. 10, 1975

Related U.S. Application Data

[62] Division of Ser. No. 301,176, Oct. 26, 1972, Pat. No. 3,885,913.

[51] Int. Cl.$^2$ ............................................. C08G 65/32
[52] U.S. Cl. ........................... 260/296 D; 252/8.55 C; 252/79.4; 252/390; 260/2 A; 260/29.2 EP; 260/288 CE; 260/288 R; 260/567.6 P
[58] Field of Search ............ 260/2 A, 288 CE, 288 R, 260/296 AE, 296 D, 296 R, 567.6 P

[56] References Cited

U.S. PATENT DOCUMENTS

| | | | |
|---|---|---|---|
| 2,483,749 | 10/1949 | Wittcoff | 260/279 |
| 3,320,317 | 5/1967 | Rogers et al. | 260/567.6 |
| 3,428,680 | 2/1969 | Walker et al. | 260/567.6 |
| 3,625,684 | 12/1971 | Poot et al. | 96/1.5 |
| 3,640,766 | 2/1972 | Jursich et al. | 117/218 |

FOREIGN PATENT DOCUMENTS 1,275,184  5/1972  United Kingdom.

*Primary Examiner*—Harold D. Anderson
*Assistant Examiner*—E. A. Nielsen
*Attorney, Agent, or Firm*—Sidney B. Ring; Hyman F. Glass

[57] ABSTRACT

Quaternary ammonium salts of polyepihalohydrin and tertiary amines and their use as corrosion inhibitors, particularly in acid systems.

7 Claims, No Drawings

QUATERNARY AMMONIUM SALTS OF POLYEPIHALOHYDRIN

This application is a division of Ser. No. 301,176 filed Oct. 26, 1972, now U.S. Pat. No. 3,885,913.

This invention relates to quaternary ammonium salts of polyepihalohydrin and tertiary amines and their use as corrosion inhibitors, particularly in acid systems.

These compositions may be ideally expressed by the following polymeric unit.

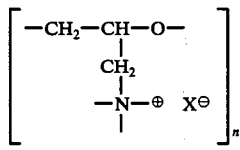

They are prepared by the following general reaction

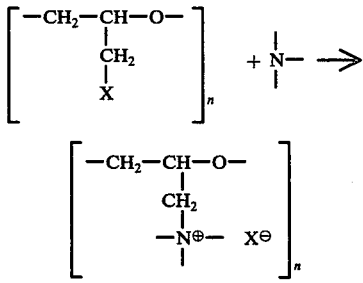

where X is halogen, for example, Cl, Br, I, F and

represents a tertiary amine,

the quaternary amine.

The polyepihalohydrin is prepared by conventional means, for example as described in U.S. Pat. Nos. 3,251,852 or 3,058,921. It may have from about 3 to 150 or more $n$ units, such as from about 5 to 100 $n$ units, but preferably from about 5 to 50 $n$ units. For optimum properties the number of $n$ units are from about 6 to 20 $n$ units.

In general, any basic amine capable of forming a quaternary amine salt can be employed. The following are non-inclusive examples:

Tertiary amines include amines of the formula

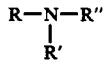

where the R's, which may or may not be the same, are a substituted group preferably a hydrocarbon group, for example alkyl, cycloalkyl, aryl, alkenyl, heterocyclic, substituted derivatives of the above, etc.

Alkyl includes methyl, ethyl, propyl, butyl, amyl, hexyl, heptyl, octyl, nonyl, decyl, undecyl, dodecyl, tridecyl, eicosyl, docosyl, etc. having 1-50 or more carbons, such as 1-30, but preferably 1-18 carbons.

The term "alkyl" also includes isomers of the straight chain group wherein branching occurs along the chain, for example

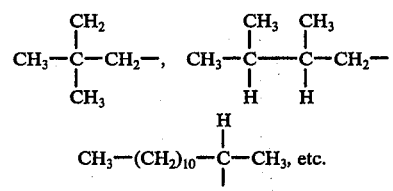

Alkenyl and alkinyl include unsaturated analogues of alkyl groups containing one or more

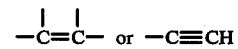

groups, for example decenyl, dodecenyl, tridecenyl, tetradecyl, pentadecenyl, hexadecyl, heptadecenyl, octadecenyl, etc., dienes for example octadienyl, etc. trienes, for example octatrienyl, etc., alkinyl, for example, butinyl, etc.

Cycloalkyl includes

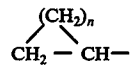

for example cyclopentyl, cyclohexyl, cycloheptyl, cyclooctyl, etc.; substituted derivatives thereof, for example alkyl cyclohexyl, dialkyl cyclohexyl, etc.

Aryl includes phenyl, substituted phenyl, alkyl phenyl, polyalkylphenyl, chlorophenyl, alkoxyphenyl, etc., naphthyl, alkyl naphthyl, etc.; benzyl, substituted benzyl, etc. groups.

Heterocyclic includes furyl, pyranyl, hydrogenated furyl, pyranyl, etc. groups.

Also included within this invention are substituted R groups. For example, where one or more of the R groups is $-(OA)_n-$ OH where $n$ is 1 or greater. For example, oxyalkylated ammonia or amines where one or more alkylene oxide units are added thereto. Examples include

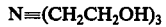

Any oxyalkylated derivatives of oxyalkylatable amines can be oxyalkylated according to this invention to place $(OA)_n$ units herein, where OA represents the alkylene oxide derived radical of a unit where $n$ can be for example 1-100, such as 1-50, for example 1-20, but preferably 1-10.

Alkylene oxides include ethylene, propylene, butylene, etc. oxides.

Examples of tertiary amines include trimethyl amine, triethyl amine, dimethyl octyl, dimethyl dodecyl, dimethyl tetradecyl, diethyl hexadecyl, methyl ethyl octadecyl, dimethyl octadecyl, etc., dimethyl octadecenyl, diethyl hexadecenyl, etc., dodacylbenzyl methyl, decyl dibenzyl, etc.; dimethyl furyl, etc., dimethyl phenyl, diethyl naphthyl, etc., dicyclohexyl methyl, dimethyl cyclohexyl, etc. amines.

The R groups of the tertiary amine may also be joined to form cyclic amines

for example, morpholines, piperidines, etc.

Certain N-substituted derivatives thereof, such as N-alkyl morpholine, N-alkyl piperidine, (N-alkyl piperidone,) etc., for example N-dodecylmorpholine,
N-octadecylmorpholine,
N-dodecylbenzylmorpholine,
N-nonylmethylbenzylmorpholine,
N-cetylpiperidine,
N-octylphenoxyethoxyethylmorpholine,
N-nonylphenoxyethoxyethylpiperidine.

In certain instances, two of the R groups are joined to form a cyclic group and the third R becomes a double bond, for example pyridine, alpha-, beta-, or gamma-picoline, other alkyl substituted pyridines, aryl substituted pyridines, alkaryl substituted pyridines, carboxy substituted pyridines, carbalkoxy substituted pyridines, nitro substituted pyridines, alkyloxy substituted pyridines, aryloxy substituted pyridines, acylaminopyridines, alkylaminopyridines, acyl substituted pyridines, and in fact any substituted pyridine. Also there may be used quinoline, isoquinoline, acridine, as well as substituted quinolines, isoquinolines, and acridines in which the substituents are as indicated for the pyridines, and indeed any cyclic compound wherein is contained one or more tertiary nitrogen atoms. Particularly useful are mixtures of alkylated pyridines and quinolines such as biproducts from the manufacture of alkyl pyridines (e.g. 2-methyl-5-ethyl pyridine) or mixtures derived from coal, often referred to as coal tar bases.

The following examples are presented for purposes of illustration and not of limitation

EXAMPLE 1

A mixture of polyepichlorohydrin, MW. 1250 (96g; 1 equiv.) was heated at 138°-140° C. with pyridine (79g; 1 mole) in water (175 ml) in a closed reactor. After heating for 3 hours the ionic chloride was found to be 10.5% indicating complete reaction. (10.1% is calculated for 100% reaction.)

EXAMPLE 2

Polyepichlorohydrin of MW. 1250 (96g; 1 equiv.) was heated with quinoline (129g; 1 mole) in water (225 ml) in a closed reactor at 144°-150° C. After 20 hours the ionic chloride was found to be 8.15% (Calculated for 100% reaction, 7.9%.)

EXAMPLE 3

A mixture of isoquinoline (129g; 1 mole), polyepichlorohydrin MW, 1250 (96g; 1 equiv.) and water (225 g) were heated in a closed reactor at 150°-160° C. for 8 hours. At this time the ionic chloride content was found to be 7.83%. (Calculated for 100% reaction 7.9%.)

EXAMPLE 4

Polyepichlorohydrin (96g; 1 equiv.) in a 1:1 mixture of isopropanol/water (238g) was heated under reflux with Reilly LAP (a commercial alkylpyridine) (142g; 1 equiv.) for 22 hours. Ionic chloride measurement at this time (2.02%) indicated 27% reaction.

EXAMPLE 5

Polyepichlorohydrin, MW.1050. (6g; 1 equiv.) was mixed with Reilly LAP (142g; 1 equiv.) in water (240 g) and heated in a closed reactor at 145°-155° C. for 14 hours. The internal pressure reached 65-70 psi during this heating period. Analysis for ionic chloride gave 6.65% indicating 89% reaction.

EXAMPLE 6

Polyepichlorohydrin (96g; 1 equiv.) was heated under reflux (88°) in a flask with condenser with Reilly HAP (a crude higher alkyl pyridine mixture) (266g; 1 equiv.) in 1:1 water (isopropanol (362g). After heating 20 hours the ionic chloride content was 1.4% indicating 30% reaction.

EXAMPLE 7

The reactants of Example 6 were heated in a closed pressure reactor at 145°-160° for 14 hours (maximum pressure 70 psi). At this time ionic chloride was found to be 4.87% indicating 99.5% reaction.

EXAMPLE 8

Polyepichlorohydrin MW. 1250 was reacted with alkyl pyridine R (a commercial alkylpyridine, Union Carbide) by the procedure of Example 6. After heating for 21 hour the ionic chloride content was found to be 1.98% indicating 30% reaction.

Mixtures of amines such as heterocyclic amines with tertiary aliphatic amines as illustrated in the following examples.

EXAMPLE 9

Polyepichlorohydrin, MW. 1250 (96g; 1 equiv.) was heated without solvent at 140°-150° C. for 10 hours with triethanolamine (37.5g; 0.25 mole) in a closed reactor. After cooling to 50° water (200g) and pyridine (60g; 0.75 mole) was added and the mixture heated at 140°-155° for 6 hours. The ionic chloride content was found to be 9.0% indicating 100% reaction.

EXAMPLE 10

This example is identical to Example 9 except that pyridine is replaced with a mixture of 2-and 4-picoline. The ionic chloride content of the product was 8.7% (100% reaction).

EXAMPLE 11

Polyepichlorohydrin, MW. 1050 (96g; 1 equiv.) was heated with alkylpyridine R (85g; 0.5 equiv.) and triethanolamine (73g; 0.5 mole) in water/isopropanol (1:1) (254g) at reflux (87°-8°). After heating 24 hours the ionic chloride content was found to be 1.85% indicating 26% reaction.

EXAMPLE 12

By the procedure of Example 11 polyepichlorohydrin (1 equiv.) was reacted with alkyl pyridine R (0.5 equiv.) and dimethylcocoamine (0.5 equiv.) in water-/isopropanol. After 22 hours the ionic chloride content was found to be 2.2% indicating 36% reaction.

Use in Acid Systems

The compounds of this invention can be employed as corrosion inhibitors for acid systems, for example, as illustrated by the pickling of ferrous metals, the treatment of calcareous earth formations, etc., as described in the following sections.

Use as Pickling Inhibitors

This phase of the invention relates to pickling. More particularly, the invention is directed to a pickling composition and to a method of pickling ferrous metal. The term "ferrous metal" as used herein refers to iron, iron alloys and steel.

To prepare ferrous metal sheet, strip, etc., for subsequent processing, it is frequently desirable to remove oxide coating, formed during manufacturing, from the surface. The presence of oxide coating, referred to as "scale" is objectionable when the material is to undergo subsequent processing. Thus, for example, oxide scale must be removed and a clean surface provided if satisfactory results are to be obtained from hot rolled sheet and strip in any operation involving deformation of the product. Similarly, steel prepared for drawing must possess a clean surface and removal of the oxide scale therefrom is essential since the scale tends to shorten drawing-die life as well as destroy the surface smoothness of the finished product. Oxide removal from sheet or strip is also necessary prior to coating operations to permit proper alloying or adherence of the coating to the ferrous metal strip or sheet. Prior to cold reduction, it is necessary that the oxide formed during hot rolling be completely removed to preclude surface irregularities and enable uniform reduction of the work.

The chemical process used to remove oxide from metal surfaces is referred to as "pickling." Typical pickling processes involve the use of aqueous acid solutions, usually inorganic acids, into which the metal article is immersed. The acid solution reacts with the oxides to form water and a salt of the acid. A common problem in this process is "overpickling" which is a condition resulting when the ferrous metal remains in the pickling solution after the oxide scale is removed from the surface and the pickling solution reacts with the ferrous base metal. An additional difficulty in pickling results from the liberated hydrogen being absorbed by the base metal and causing hydrogen embrittlement. To overcome the aforementioned problems in pickling, it has been customary to add corrosion inhibitors to the pickling solution.

The present invention avoids the above-described problems in pickling ferrous metal articles and provides a pickling composition which minimizes corrision, overpickling and hydrogen embrittlement. Thus the pickling inhibitors described herein not only prevent excessive dissolution of the ferrous base metal but effectively limit the amount of hydrogen absorption thereby during pickling. According to the invention, a pickling composition for ferrous metal is provided which comprises a pickling acid such as sulfuric or hydrochloric acid and a small but effective amount of the compounds of this invention, for example at least about 50 p.p.m., such as from about 100 to 10,000 p.p.m., but preferably from about 500 to 5,000 or more p.p.m.

Ferrous metal articles are pickled by contacting the suface (usually by immersion in the pickling solution) with a pickling composition as described to remove oxide from their surface with minimum dissolution and hydrogen embrittlement thereof and then washing the ferrous metal to remove the pickling composition therefrom.

Use in Acidizing Earth Formations

The compositions of this invention can also be used as corrosion inhibitors in acidizing media employed in the treatment of deep wells to reverse the production of petroleum or gas therefrom and more particularly to an improved method of acidizing a calcareous or magnesium oil-bearing formation.

It is well known that production of petroleum or gas from a limestone, dolomite, or other calcareous-magnesian formation can be stimulated by introducing an acid into the producing well and forcing it into the oil or gas bearing formation. The treating acid, commonly a mineral acid such as HCl, is capable of forming water soluble salts upon contact with the formation and is effective to increase the permeability thereof and augment the flow of petroleum to the producing well.

The corrosion inhibitors were evaluated using sand blasted 1020 mild steel coupons monitored by a polarization resistance meter, a Pair instrument described in U.S. Pat. No. 3,406,101.

The acid was placed in a beaker and the coupons placed in the acid. Corrosion rates were measured at various time intervals and percent protection calculated in the usual manner as follows:

Percent protection = $(R_1 - R_2/R_1) \times 100$ where
$R_1$ is corrosion rate without inhibitor
$R_2$ is corrosion in presence of inhibitor.

The utility of the compositions of this invention is illustrated in the following tables.

Use as Corrosion Inhibitors in Highly Acid Systems

| Compound | Concentration | Corrosion Rate (MPH) | Protection |
|---|---|---|---|
| Example 1 | 0.25% | 3.25 | 82% |
| Example 2 | 0.25% | 2.75 | 85% |
| Example 3 | 0.25% | 2.85 | 85% |
| Example 5 | 0.25% | 2.45 | 87% |
| Example 7 | 0.25% | 2.85 | 85% |
| Example 8 | 0.25% | 4.07 | 78% |
| Example 9 | 0.25% | 2.05 | 89% |
| Example 10 | 0.25% | 1.59 | 92% |
| Example 11 | 0.25% | 3.32 | 82% |
| Example 12 | 0.25% | 7.38 | 60% |
| Blank | — | 18.56 | — |

| Compound | Concentration | Corrosion Rate (MPH) | Protection |
|---|---|---|---|
| Example 1 | 0.25% | 8.4 | 58% |
| Example 2 | 0.25% | 10.5 | 47% |
| Example 8 | 0.25% | 11.61 | 48% |
| Example 9 | 0.25% | 4.97 | 77% |
| Example 10 | 0.25% | 3.62 | 84% |
| Example 11 | 0.25% | 5.24 | 76% |
| Example 12 | 0.25% | 13.00 | 41% |
| Blank | — | 22.23 | — |

The above tests illustrate an important aspect of the pickling inhibitors of this invention in that they remain effective in the presence of dissolved ferrous ions (from dissolution of the oxide scale).

The amount of inhibitor employed in treating the corrosive systems of this invention will vary with the particular compound employed, the particular system, the solids present in the system, the degree of corrosivity of the system, etc. A minor amount of the compound is generally employed sufficient to impart corrision protection to the system.

As is quite evident, new polyepichlorohydrin-quaternary amine compounds will be constantly developed which could be useful in this invention. It is, therefore, not only impossible to attempt a comprehensive catalogue of such compositions, but to attempt to describe the invention in its broader aspects in terms of specific chemical names used would be too voluminous and unnecessary since one skilled in the art could by following the description of the invention herein select a useful compound. This invention lies in the use of suitable compounds as corrosion inhibitors in acid systems and their individual compositions are important only in the sense that their properties can affect this function. To precisely define each specific useful compound and acid system in light of the present disclosure would merely call for knowledge within the skill of the art in a manner analagous to a mechanical engineer who prescribes in the construction of a machine the proper materials and the proper dimensions thereof. From the description in this specification and with the knowledge of a chemist, one will know or deduce with confidence the applicability of such specific compounds suitable for this invention by applying them in the process set forth herein. In analogy to the case of a machine, wherein the use of certain materials of construction or dimensions of part would lead to no practical useful result, various materials will be rejected as inapplicable where others would be operative. One can obviously assume that no one will wish to use a useless compound nor will be misled because it is possible to misapply the teachings of the present disclosure to do so. Thus, any such compound or mixtures containing them that can perform the function stated herein can be employed.

It is to be noted that partially quaternized polyepihalohydrins are effective as inhibitors. Thus, the term "quaternaries of polyepihalohydrins" includes partially as well as completely quaternized polyepihalohydrins.

We claim:

1. Polyquaternaries of polyepichlorohydrins and tertiary amine where the polyquaternary contains both heterocyclic and aliphatic tertiary amines and is formed by the quaternization of the polyepichlorohydrin with about one mol of a mixture of about ¼ to ½ mol of an aliphatic tertiary amine and correspondingly about ¾ to ½ mol of a heterocyclic amine which is pyridine, quinoline, isoquinoline, alkyl derivatives thereof or mixtures thereof per equivalent of polyepichlorohydrin.

2. The polyquaternaries of claim 1 where the polyepichlorohydrin has from 3 to 150

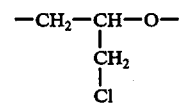

units.

3. The polyquaternary of claim 2 where the heterocyclic tertiary amine is pyridine, an alkyl pyridine, or a mixture thereof.

4. The polyquaternaries of claim 3 where the polyepichlorohydrin contains 6 to 20 units.

5. The polyquaternaries of claim 4 where the aliphatic tertiary amine is an alkanolamine.

6. The polyquaternaries of claim 5 where the mixture is a mixture of ¼ mol of triethanolamine and ¾ mol of pyridine and the polyepichlorohydrin is of molecular weight 1250.

7. The polyquaternaries of claim 5 where the mixture is a mixture of ¼ mol of triethanolamine and ¾ mol of a mixture of 2- and 4-picoline and the polyepichlorohydrin is of molecular weight 1250.

* * * * *